Figure 1:
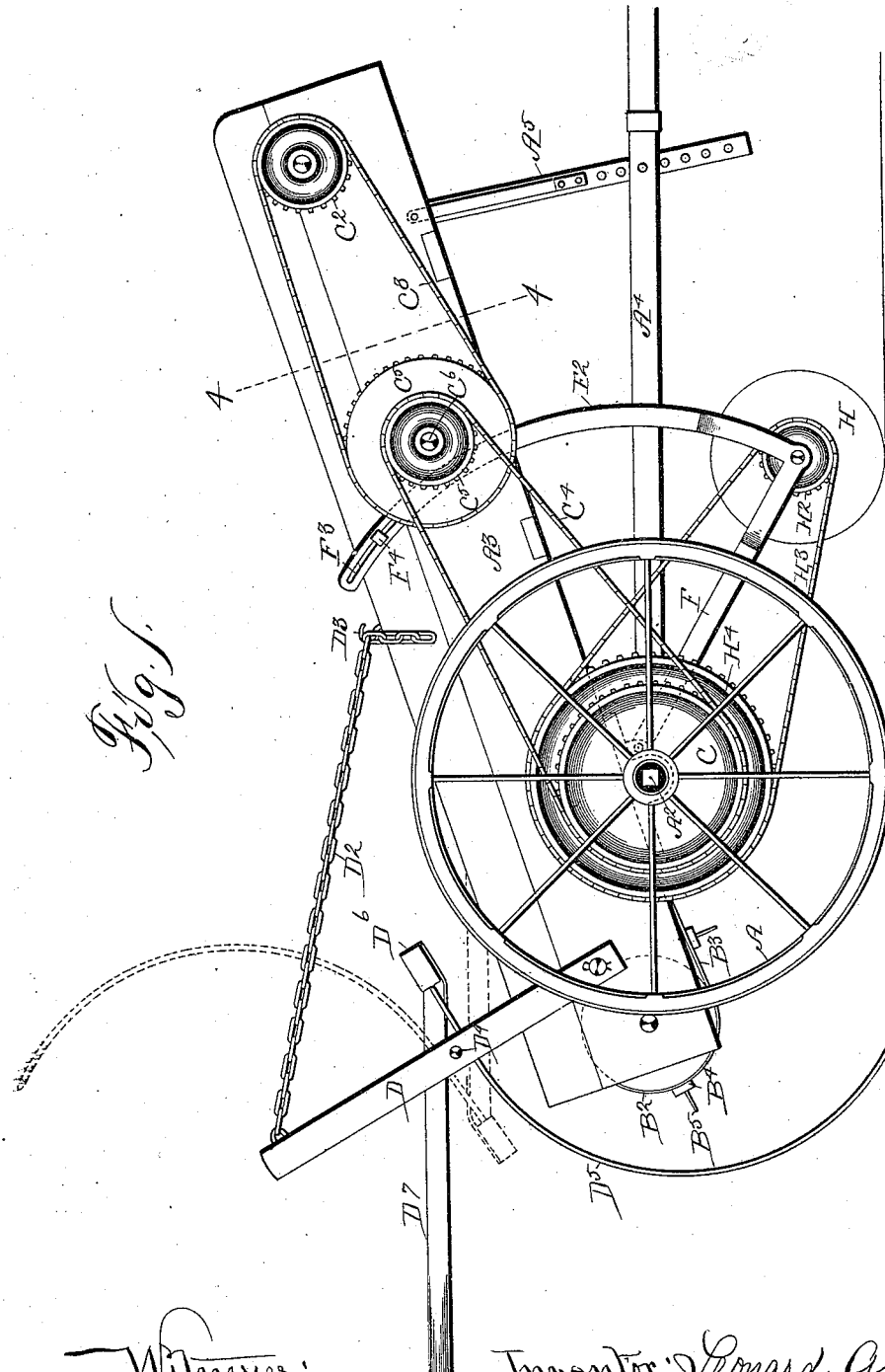

(No Model.)  3 Sheets—Sheet 1.

L. AVERY.
HAY RAKE AND LOADER.

No. 575,021. Patented Jan. 12, 1897.

Witnesses:
W. J. Sankey
R. G. Orwig

Inventor: Leonard Avery
By Thomas G. and J. Ralph Orwig,
Attorneys

THE NORRIS PETERS CO., PHOTO-LITHO., WASHINGTON, D. C.

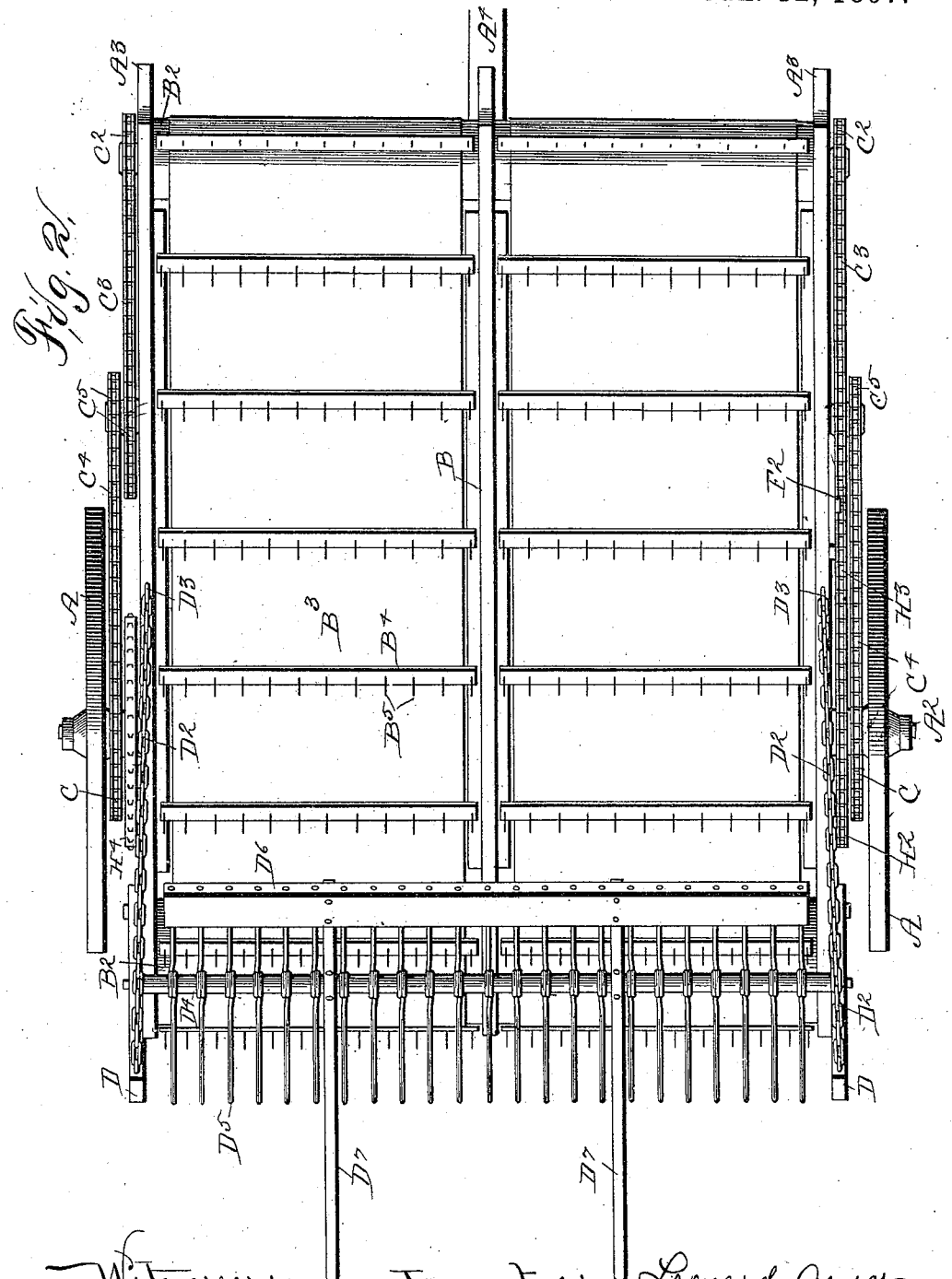

(No Model.)
3 Sheets—Sheet 3.
L. AVERY.
HAY RAKE AND LOADER.
No. 575,021.
Patented Jan. 12, 1897.
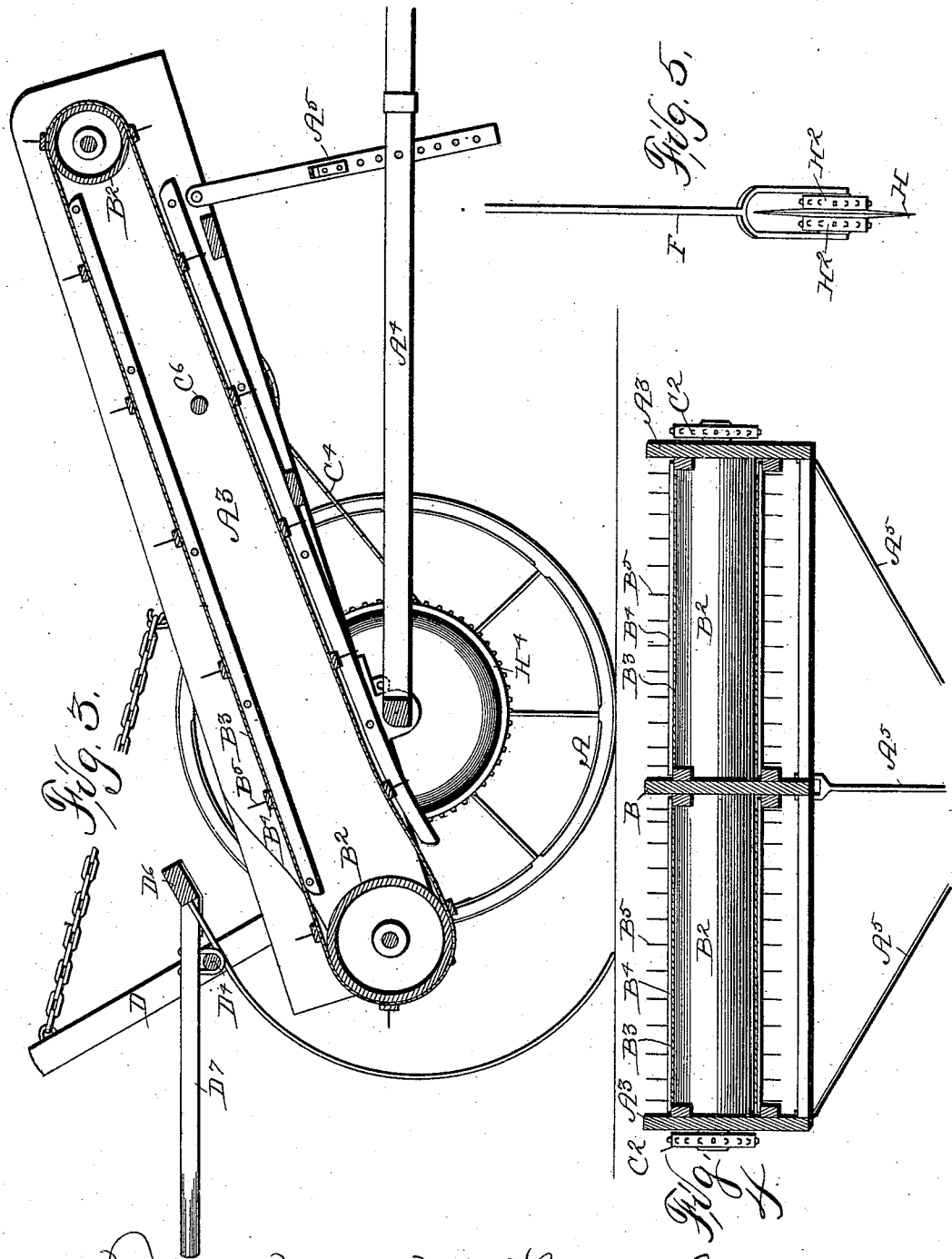
Witnesses:
W. J. Sankey,
R. G. Cowig,
Inventor: Leonard Avery,
By Thomas G. and J. Ralph Orwig,
Attorneys.

UNITED STATES PATENT OFFICE.

LEONARD AVERY, OF MONTOUR, IOWA.

HAY RAKE AND LOADER.

SPECIFICATION forming part of Letters Patent No. 575,021, dated January 12, 1897.

Application filed July 10, 1896. Serial No. 598,773. (No model.)

*To all whom it may concern:*

Be it known that I, LEONARD AVERY, a citizen of the United States of America, residing at Montour, in the county of Tama and State of Iowa, have invented certain new and useful Improvements in Hay Rakes and Loaders, of which the following is a specification.

The objects of this invention are, first, to provide a hay-rake of strong and durable construction that may be attached to a hay-wagon and automatically operated upon the advancement of the same; to provide improved means for raking the hay, which means will readily adapt itself to different conditions of the hay or ground-surface, and may be set to engage the ground-surface with greater or less force.

A further object is to provide means for cutting the hay on the field into strips, so that it may be readily gathered up by the rake.

A further object is to provide means whereby the hay is elevated on one side of the rake when the rake is being turned around a corner, to thus prevent clogging of the elevator.

My invention consists in certain details in the construction, arrangement, and combination of the various parts of the device, as hereinafter set forth, pointed out in my claims, and illustrated in the accompanying drawings, in which—

Figure 1 shows a side elevation of the complete rake and loader. Fig. 2 shows a top or plan view of the same. Fig. 3 is a vertical longitudinal sectional view of the complete machine. Fig. 4 shows a transverse section through the line 4 4 of Fig. 1. Fig. 5 shows a detail rear elevation of the hay-cutting device.

Referring to the accompanying drawings, the reference-letter A is used to indicate the driving-wheels mounted on the axle $A^2$, which is fixed in the frame $A^3$. $A^4$ indicates a tongue fixed to said axle and having a brace $A^5$ adjustably fixed to its front end and pivoted to the sides and central partition of the frame $A^3$, as shown in Fig. 4, thus providing means for adjusting the loader vertically, its front end relative to a hay-wagon, and the rear end relative to the ground-surface.

The frame $A^3$ is divided longitudinally by a partition B, and two independent rollers $B^2$ are mounted in the opposite ends thereof. Over these rollers are passed two independent belt conveyers $B^3$, having cross-strips $B^4$ thereon, provided with teeth $B^5$. These conveyers are each driven by means of a sprocket C on the driving-wheel, geared to a sprocket $C^2$ on the end of the upper roller by means of the chains $C^3$ and $C^4$ and, through the speed-increasing sprockets $C^5$, mounted on a stub-axle $C^6$.

As each conveyer is driven independently of the other it is obvious that when turning a corner and one wheel is advancing while the other is standing stationary or only moving slightly the conveyer on one side will continue to operate, and thus carry off the hay that is gathered when turning, and hence prevent the conveyer from clogging with hay.

For raking up the hay from the field I have provided two arms D, pivoted to the opposite sides of the machine-frame and supported by means of chains $D^2$, attached to their upper ends and adjustably secured to the hooks $D^3$ on the side pieces of the frame. Between these supports is mounted a bar $D^4$, and on this bar the rake-teeth $D^5$ are pivoted. A cross-piece $D^6$ is fixed to the upper ends of the rake-teeth to hold them in the same plane, the weight of the teeth being sufficient to hold them in engagement with the ground-surface. $D^7$ indicates a handle secured to the said cross-piece, whereby the rake may be turned out of engagement with the ground, with the handles extending forwardly, as illustrated in Fig. 1.

It is obvious that by the various means of adjustment of the rake it may be adapted to any condition of the hay or ground-surface and any degree of elevation of the rear end of the frame.

F indicates an arm pivotally and detachably secured to the machine-frame near the rear axle, forked at its lower end and having a curved arm $F^2$, connected with said lower end, also forked and provided with a slot $F^3$ at its top. A bolt $F^4$ is passed through this slot into the machine-frame to thus provide means for adjusting vertically the lower end of said arm F. H indicates a sharp-edged colter-wheel mounted in the forked end of said arm and having a sprocket-wheel $H^2$ fixed to its axle. A sprocket-chain $H^3$ connects said sprocket-wheel with a sprocket $H^4$ on the driving-axle, thus providing means for rotating the colter forwardly during the advancement of the machine. A like sprocket H⁴ is fixed to each of the driving-wheels, so that the colter may be used on either side of the loader. This device is for the purpose of cutting the hay lying on the ground-surface into strips of such width that the rake will take up one complete strip, and thus prevent the usual loss of hay incident to leaving the rake pull the hay apart and thus scatter some of the hay on the ground-surface already gone over by the rake.

Having thus described my invention, what I claim as new, and desire to secure by Letters Patent of the United States therefor, is—

1. The combination with a hay-loader of two arms pivoted to the sides of the frame to swing longitudinally of the frame, a bar mounted in said arms, rake-teeth pivoted to the bar and so arranged that said teeth may swing upwardly and rest on the top of the loader-frame, and means for adjusting said arms to change the position of the said teeth relative to the ground and the loader, for the purposes stated.

2. The combination with a suitable hay-loader, of two arms pivoted to the sides of the loader, a chain attached to each, hooks secured to the loader-frame to hold the chain, a bar pivotally mounted in the said arms, rake-teeth mounted thereon, a cross-bar for connecting the teeth and a handle secured to said cross-bar, all arranged substantially as and for the purposes stated.

3. The combination with a hay rake and loader, of an arm pivoted to one side of the loader-frame, a sharp-edged colter rotatably mounted in said arm, a sprocket-wheel fixed to the colter, a sprocket-chain driven by power derived from the loader passed around said wheel, and means for adjusting the colter relative to the loader-frame.

4. The combination with a hay rake and loader, of a sprocket-wheel connected with each of the driving-wheels, an arm having a bifurcated lower end, means for pivotally and detachably securing the arm to either side of the loader-frame, a sharp-edged colter, mounted in the said arm, a sprocket-wheel connected therewith, a chain for gearing it to one of the sprockets on the driving-wheels, and a rod leading from the lower end of said arm and adjustably secured to the loader-frame, substantially as and for the purposes stated.

LEONARD AVERY.

Witnesses:
C. J. STEVENS,
A. J. DINGER.